Feb. 18, 1941.    C. DEEDERER    2,232,316
INSTRUMENT FOR MEASURING HUMAN DEFICIENCIES OF CHEMICALS IN THE BLOOD
Filed Nov. 14, 1938
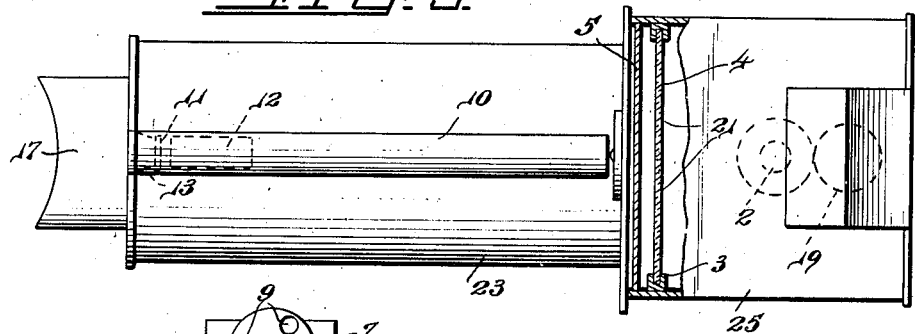
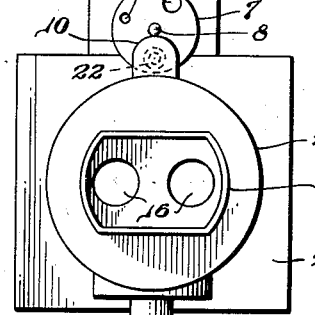
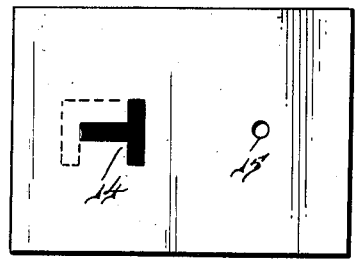
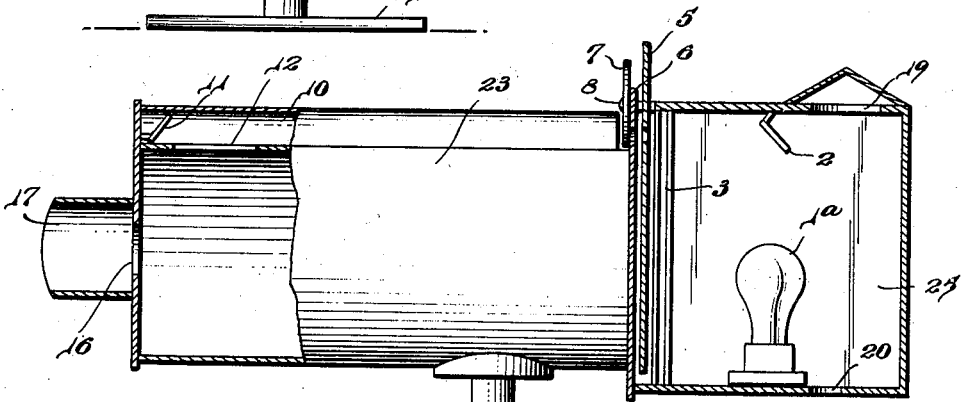
Inventor
Carlton Deederer Patented Feb. 18, 1941

2,232,316

UNITED STATES PATENT OFFICE 2,232,316

INSTRUMENT FOR MEASURING HUMAN DE-
FICIENCIES OF CHEMICALS IN THE
BLOOD

Carleton Deederer, Miami, Fla.

Application November 14, 1938, Serial No. 240,350

8 Claims. (Cl. 88—20)

My invention relates to a mechanism for testing the degree of chemical change in vitamin A in the retina of the eye from viewing a glare of light and then determining how long it will take for the visual substances to regenerate or reappear sufficiently for the individual to identify letters which are illuminated by a fraction of the original light.

An allied and further object of my invention is the use of objects to be viewed during the recovering period, which have the same area substantially in order that the subject may be fooled if he attempt to guess regularly, by this substitution of letters. It so happens that two letters can be constructed to have substantially exactly the same area and they are the letters in gothic design T and L. No other letters fill this requirement without having variations in legibility.

Another allied function of the invention is to facilitate the aforesaid tests but in the case of a subject with impaired light conductivity in the structures of the eye to furnish a means of altering the luminosity of the letter by graduated apertures in the path of the rays from the source of light to the letter.

Another object of the invention is to accomplish these tests without the subject's looking through glass between his eyes and the source of glare to preserve to an extent a portion of the full effect of the actinic rays which though reduced are yet not too great to be viewed.

Another object of my invention is to illuminate said letters with reflected light which will vary substantially exactly in proportion to any deviation in intensity or brightness of the original source of light for the express purpose of increasing the accuracy of the test as will readily be understood.

Another object of my invention is to reduce the measurement of vitamin A deficiencies to human standards versus rat standards as ordinarily employed. This is accomplished by testing a person before and after taking vitamin A and establishing simple standards, such as if recovery from the glare takes 10 seconds and then the subject is administered vitamin A in daily amounts necessary to enable him to recognize the same letter under the same conditions in less than four seconds we can give a value to such dosage according to this human reaction without depending on testing on rats—a method which might bear some discrepancies when applied to humans.

For convenience and scientific facility such an amount of vitamin A is called 10 human units.

Now comes a further use of the apparatus. When it is found out by this vitamin-A-scope that an individual takes 10 seconds to identify the letter and we administer the socalled 10 units of vitamin A, it is customary for him to be able some days later to identify the letter in less than 4 seconds.

A further object of the invention is to have the curtain shutter on some spring other than hand or gravity operation released by a catch and which catch automatically releases a timing device which in turn shows readings in terms of vitamin A which in the opinion of the operator or accepted experience may be indicated.

The applicant is aware of other devices, some much more complicated, in which the aim was to arrive at some basis for determining vitamin A starvation by glare methods but the applicant points out that here is a device designed for more specific purposes and which purposes it attains in the most simple manner, as simple as looking at head lights on the road and timing the recovery except that such a method is not adaptable to standardization in terms of human units.

It is pointed out that this instrument is primarily for chemical analysis of materials carried in the blood rather than an ordinary eye testing machine and does determine vitamin A deficiency by simple and accurate methods in conjunction with the administration of definite quantities of vitamin A.

By using the instrument on hundreds of cases under the administration of vitamin-A, vitamin-A itself is thus standardized. In other words to make a ruler we use another straight edge and from this another and prove one against the other. But someone had to make the first. Vitamin-A-scopes have further methods of checking one sign of deficiency against another.

It so happens that when an individual is deficient in vitamin-A his skin gets thinner as in the aged. For instance one who has a skin thickness on the back of the hand of .0075 inch will show a deficiency of vitamin-A indicated by approximately a fifteen second reading time on the vitaminascope. This has a great advantage over all other methods of testing vitamin-A content in that it is based absolutely on the human instead of on rats as is customary, because of physiological differences between rats and man, well known in the scientific world, and which can be very readily substantiated.

In the drawing Fig. 1 is a side elevation of a vitamin-A-scope, Figure 2 front elevation, Fig. 3 top view, Figure 4 detail of a curtain shutter.

In Fig. 1 1—a is an original source of light represented here as a conventional light bulb. 2 shows a little mirror placed at an angle to throw light rays along a forward path first through the box containing the source of light, then over a white glass plate when it is in the box, through one of a series of holes in the shutter curtain 5, then through a hole shown in the box 25 at 22, then through a tubular archway 10 to reflector 11 from whence down to the middle of the curtain 5, as at 14, Fig. 4.

Fig. 1 shows a lateral slot 3 in which is held the white plate glass 4. The glass is omitted in Fig. 1 for clarity but indicated in Fig. 3 at 4. 17 is the ocular piece substantially shaped to fit the average forehead.

Fig. 1, 24 is a conventional base or foot piece, 18 a post joined to the cylinder 23 which is hollow like a pipe; 19 is a tented ventilator, 20 is a ventilating aperture; 7 is a rotatable dial or disc with different sized apertures in it for governing the amount of light desired to fall on the letter to be identified; 8 indicates the location of a centre screw on which rotates the disc 7.

Fig. 2 a front view of the instrument shows the ocular portion 17 or light guard; two holes in the front end of the hollow cylinder at 16 to look through, holes 9 in rotatable disc 7 pivoted at 8; box 25 for the source of light, arched tubeway 10 and hole in front end of box 25 at 22.

Figure 3 top view shows eye piece 17 joined by solder or other conventional way to end of cylinder 23 which end is carried upward to form a door or closure for the end of the arched tubeway and to which tubeway is fastened reflector 11. The side of the cylinder beneath the arched tubeway is cut away at 12 to allow light from the reflector 11 to pass downward into the cylinder to illuminate the figure or letter on the curtain shutter. 3 shows the position of the channels in which is inserted the white glass 4.

Figure 4 shows a plan view of the curtain shutter represented as a card of Bakelite preferably black with white core and letters engraved to show as white though it may be white card and black letter as shown at 14 and a hole through the shutter at 15 of right height that it can be placed opposite the hole in the rotatable disc and that in the arched tubeway.

*Mode of operation.*—The subject or person to be tested gazes into the vitaminascope and sees a wide circle of light because the cylinder has no base and the subject sees the white glass straight ahead and for the entire width of the inner diameter of the cylinder. And in the centre of this white glass is a sizeable circle readily observed and constructed preferably of a ground glass surface on the white glass or else with white shellac or other means, indicated in the depressions of dotted lines at 21.

In a matter of a number of seconds for instance twenty seconds the eye will "tire" to light to some extent. When suddenly the shutter is dropped or otherwise forced down the subject sees no light at all at first but after two to one hundred and twenty seconds can identify the letter "T" depending on natural eye phenomena due to using up of visual purple in the retina of the eye. When the blood stream of the individual is substantially deficient in vitamin A the regenerating of visual substances takes a longer time and which time is proportional to the vitamin A content in the blood stream of the subject being examined.

Conversely when regeneration of sight materials takes a longer time than the best average the individual is deficient in vitamin A and in some definite relationship or proportion to the time required for recovery sufficient to identify the letter.

With the instrument described the method used is to name the amount of human units necessary daily to drop a reading from 10 down to below 4 seconds, as 10 human units. It could be called any other number but as pioneer choice and for scientific reasons making description of the invention easier and its use more adaptable to its purposes this standard has been chosen by the inventor.

The light bulb for experimental or diagnostic or therapeutic purposes may be changed or covered with colored transparent material to get different color effects, without detracting from the purpose of my invention. Experience has taught that the brightness of the circular glare should be an amount of light not less than a 75 watt bulb of Mazda type. Also the glare should not be above that made with a 100 watt similar bulb because this would too greatly damage the retinal supply of sight chemicals.

So far as is known by the inventor this instrument is the first to account for human needs of vitamin A in terms of human units. The inventor is aware of many optical instruments for testing the eyes and even for testing the effects of glare on sight but is unaware to date of any instrument which accomplishes the desired ends as accurately or simply because of the fact that other instruments take much longer to operate and depend on more complicated methods of illumination control such as using rheostats and not a definite fraction of the original glare which has the signal advantage that should a slight weakness in the source of light develop there will be a corresponding weakness in the illumination of the letter which will compensate and maintain the standardization of the reading time.

It is scientifically imperative in viewing figures in the period of recovery after viewing a glare that the figures be substitutable in order that the operator may be assured that any identical figure was identified by the subject and furthermore that these figures have the same color, similar light values and not only the same area of discernable shade but also a structure distinctly different yet equally readable, not more not less and that the figure be so well known that the mental hazards be reduced to a minimum. It is for that reason that the inventor introduced the letters T and L which have the aforesaid properties only when also printed in "block" type, for if in any other type such as Caslon, Cheltenham, Goudy, Old Style Roman parts of these letters would be preceptible before others and as simple as this mechanical matter is it is essential to scientific accuracy. It is known by the inventor that in eye tests all the letters of the alphabet are used but here the difference is the absolute limitation to letters T and L is an integral part of the apparatus, though it can be conceived that this method could be imitated though poorly by using such awkward substitutes as a cross slightly turned or an object upside down.

The inventor does not limit himself to the use of gravity or pushing to introduce the slide but conceives of many other methods such as in a camera with a curtain shutter, well known. This invention depends on the unusual arrangements of parts and features to accomplish new and useful purposes yet to be attained otherwise by the use of the same or simpler arrangements of parts and features in a scope for the express purpose of determining human deficiencies of vitamin A in the system.

Having thus disclosed my invention I desire Letters Patent and claim:

1. A device for determining human deficiencies of vitamin A including a casing having a closed light chamber, a light source located within said chamber, a light confining cylinder secured at one end to said casing, and extending into open communication with said chamber, a viewing shield mounted at the other end of said cylinder, a light transparent sheet mounted in said chamber and disposed between said light source and said viewing shield, means including an enclosure communicating with said light chamber and said light confining cylinder and associated reflecting means positioned within said light chamber and said enclosure for directing a portion of the light from said source in a direction above said view shield and back towards said light source, and light opaque means having test characters thereon interposable between said light source and said viewing shield whereby the direct source of light is cut off and said light portion will be projected upon said interposed means, the period between interposition of said light opaque means between said light source and said viewing shield and the visibility of said test characters upon said light opaque means providing a measurement for determining human deficiencies of vitamin A.

2. A device for determining human deficiencies of vitamin A including a casing having a closed light chamber, a light source located within said chamber, a light confining cylinder secured at one end to said casing, and extending into open communication with said chamber, a viewing shield mounted at the other end of said cylinder, a light transparent sheet mounted in said chamber and disposed between said light source and said viewing shield, means including an enclosure communicating with said light chamber and said light confining cylinder and associated reflecting means positioned within said light chamber and said enclosure for directing a portion of the light from said source in a direction above said view shield and back towards said light source, and means interposable between said light source and said viewing shield whereby the direct source of light is cut off and said light portion will be projected upon said interposed means, said last named means including an opaque shutter having one or more characters formed on the side facing said viewing shield, said shutter being provided with an aperture disposed to permit passage of said light portion past said shutter, the period between interposition of said shutter between said light source and said viewing shield and the visibility of said characters upon said shutter providing a measurement for determining human deficiencies of vitamin A.

3. A device for determining human deficiencies of vitamin A including a casing having a closed light chamber, a light source located within said chamber, a light confining cylinder secured at one end to said casing, and extending into open communication with said chamber, a viewing shield mounted at the other end of said cylinder, a light transparent sheet mounted in said chamber and disposed between said light source and said viewing shield, an enclosure communicating with said chamber and said light confining cylinder, a reflector mounted in said chamber above said light source, a second reflector mounted within said enclosure, said reflectors being so disposed with respect to the communications of said enclosure with said chamber and said light confining cylinder that a portion of light from said source is directed therefrom to said first reflector, thence onto said second reflector and back towards said light source, and light opaque means having test characters thereon interposable between said light source and said viewing shield whereby the direct source of light is cut off and said light portion will be projected upon said test characters upon said interposed light opaque means, the period between interposition of said light opaque means between said light source and said viewing shield and the visibility of said test characters upon said light opaque means providing a measurement for determining human deficiencies of vitamin A.

4. A device for determining human deficiencies of vitamin A including a casing having a closed light chamber, a light source located within said chamber, a light confining cylinder secured at one end to said casing, and extending into open communication with said chamber, a viewing shield mounted at the other end of said cylinder, a light transparent sheet mounted in said chamber and disposed between said light source and said viewing shield, an enclosure communicating with said chamber and said light confining cylinder, a reflector mounted in said chamber above said light source, a second reflector mounted within said enclosure, said reflectors being so disposed with respect to the communications of said enclosure with said chamber and said light confining cylinder that a portion of light from said source is directed therefrom to said first reflector, thence onto said second reflector and back towards said light source, and means interposable between said light source and said viewing shield whereby the direct source of light is cut off and said light portion will be projected upon said interposed means, said last named means including an opaque shutter having one or more characters formed on the side facing said viewing shield, said shutter being provided with an aperture disposed to permit passage of said light portion past said shutter, the period between interposition of said shutter between said light source and said viewing shield and the visibility of said characters upon said shutter providing a measurement for determining human deficiencies of vitamin A.

5. A device for determining human deficiencies of vitamin A including a casing having a closed light chamber, a light source located within said chamber, a light confining cylinder secured at one end to said casing, and extending into open communication with said chamber, a viewing shield mounted at the other end of said cylinder, a light transparent sheet mounted in said chamber and disposed between said light source and said viewing shield, means including an enclosure communicating with said light chamber and said light confining cylinder and associated reflecting means positioned within said light chamber and said enclosure for directing a portion of the light from said source in a direction above said view shield and back towards said light source, light opaque means having test characters thereon interposable between said light source and said viewing shield whereby the direct source of light is cut off and said light portion will be projected upon said interposed means, and means disposed within the path of said light portion whereby the amount of said light which is directed back toward said light source may be regulated, the period between interposition of said light opaque means between said light source and said viewing shield and the visibility of said test characters upon said light opaque means providing a measurement for determining human deficiencies of vitamin A.

6. A device for determining human deficiencies of vitamin A including a casing having a closed light chamber, a light source located within said chamber, a light confining cylinder secured at one end to said casing, and extending into open communication with said chamber, a viewing shield mounted at the other end of said cylinder, a light transparent sheet mounted in said chamber and disposed between said light source and said viewing shield, means including an enclosure communicating with said light chamber and said light confining cylinder and associated reflecting means positioned within said light chamber and said enclosure for directing a portion of the light from said source in a direction above said view shield and back towards said light source, light opaque means having test characters thereon interposable between said light source and said viewing shield whereby the direct source of light is cut off and said light portion will be projected upon said interposed means, and means disposed within the path of said light portion whereby the amount of said light which is directed back toward said light source may be regulated, said last named means including a manually rotatable diaphragm provided with a plurality of different sized apertures, the period between interposition of said light opaque means between said light source and said viewing shield and the visibility of said test characters upon said light opaque means providing a measurement for determining human deficiencies of vitamin A.

7. A device for determining human deficiencies of vitamin A including a casing having a closed light chamber, a light source located within said chamber, a light confining cylinder secured at one end to said casing, and extending into open communication with said chamber, a viewing shield mounted at the other end of said cylinder, a light transparent sheet mounted in said chamber and disposed between said light source and said viewing shield, an enclosure communicating with said chamber and said light confining cylinder, a reflector mounted in said chamber above said light source, a second reflector mounted within said enclosure, said reflectors being so disposed with respect to the communications of said enclosure with said chamber and said light confining cylinder that a portion of light from said source is directed therefrom to said first reflector, thence onto said second reflector and back towards said light source, light opaque means having test characters thereon interposable between said light source and said viewing shield whereby the direct source of light is cut off and said light portion will be projected upon said test characters upon said interposed light opaque means, and means disposed within the path of said light portion whereby the amount of said light which is directed back toward said light source may be regulated, said last named means including a manually rotatable diaphragm provided with a plurality of different sized apertures, the period between interposition of said light opaque means between said light source and said viewing shield and the visibility of said test characters upon said light opaque means providing a measurement for determining human deficiencies of vitamin A.

8. A device for determining human deficiencies of vitamin A including an elongated casing, a light source positioned within the casing adjacent one end thereof, view openings through the opposite end of the casing, a translucent light sheet intersecting the casing intermediate the light source and the view openings, a confined light passage communicating directly with the light source and with the casing to each side of the translucent light sheet, a reflector positioned with respect to the light source, a second reflector positioned within said confined light passage, the said confined light passage and the two reflectors being cooperatively arranged to direct a portion of said light source in a direction above said translucent light sheet and back toward said light source, and light opaque means having test characters thereon interposable between said translucent light sheet and said view openings, whereby the direct light source is eliminated from the view openings and said light portion will be projected upon said test characters of said interposed means, the period between interposition of said light opaque means and the visibility of said test characters thereon providing a measurement for determining human deficiencies of vitamin A.

CARLETON DEEDERER.